(12) United States Patent
Harada

(10) Patent No.: US 11,826,844 B2
(45) Date of Patent: Nov. 28, 2023

(54) THREAD FORMING TAP FOR BALLSCREW

(71) Applicant: OSG CORPORATION, Toyokawa (JP)

(72) Inventor: Kazumitsu Harada, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 0 days.

(21) Appl. No.: 17/793,517

(22) PCT Filed: Jan. 21, 2020

(86) PCT No.: PCT/JP2020/002001
§ 371 (c)(1),
(2) Date: Jul. 18, 2022

(87) PCT Pub. No.: WO2021/149168
PCT Pub. Date: Jul. 29, 2021

(65) Prior Publication Data
US 2023/0122014 A1 Apr. 20, 2023

(51) Int. Cl.
*B23G 7/02* (2006.01)
*B23G 5/06* (2006.01)

(52) U.S. Cl.
CPC . *B23G 7/02* (2013.01); *B23G 5/06* (2013.01)

(58) Field of Classification Search
CPC ........ B23G 7/00; B23G 7/02; B23G 2210/28; B23G 2210/21; B23G 2200/28; B23G 2200/30; B23G 5/06; B21H 3/08
See application file for complete search history.

(56) References Cited

U.S. PATENT DOCUMENTS 3,248,747 A * 5/1966 Scott .................. B23G 7/02
470/204
3,561,171 A * 2/1971 Van Vleet et al. ..... B24B 19/02
451/48
(Continued)

FOREIGN PATENT DOCUMENTS

DE 2302920 A1 * 8/1973 ............... B23G 7/02
EP 0004089 A1 9/1979
(Continued)

OTHER PUBLICATIONS

DE 10338754 A1, Glimpel et al. Mar. 2005.*
(Continued)

*Primary Examiner* — Edward T Tolan
(74) *Attorney, Agent, or Firm* — Oliff PLC

(57) ABSTRACT

A ballscrew thread forming tap including a complete thread portion and a leading portion is to be screwed into a prepared hole provided in a workpiece so as to cause an inner circumferential surface of the prepared hole to be plastically deformed for thereby forming a ballscrew thread corresponding to an external thread provided in the complete thread portion. A screw thread of the external thread has a leading flank and a trailing flank, which are to be positioned on a front side of the trailing flank and on a rear side of the leading flank, respectively, when the ballscrew thread forming tap is screwed into the prepared hole. The screw thread is formed such that, in the leading portion, an indentation depth into the workpiece made by the leading flank is smaller than an indentation depth into the workpiece made by the trailing flank.

11 Claims, 9 Drawing Sheets

(56) References Cited

U.S. PATENT DOCUMENTS

| | | | |
|---|---|---|---|
| 6,334,370 B1 | 1/2002 | Sonoda et al. | |
| 8,602,696 B2* | 12/2013 | Ellis | B23G 7/02 |
| | | | 470/204 |
| 2011/0085867 A1 | 4/2011 | Ellis | |
| 2021/0138567 A1* | 5/2021 | Hechtle | B23G 7/02 |
| 2023/0049644 A1* | 2/2023 | Harada | B23G 7/02 |

FOREIGN PATENT DOCUMENTS

| | | |
|---|---|---|
| JP | H01-289615 A | 11/1989 |
| JP | H02-074127 U | 6/1990 |
| JP | 2000-088072 A | 3/2000 |
| JP | 2004-314231 A | 11/2004 |

OTHER PUBLICATIONS

DE 102005010543 A1, Glimpel et al. Sep. 2006.*
DE 2811193 B, Gartner Jul. 1979.*
WO 2012161506 A2, Kim Nov. 2012.*
Apr. 7, 2020 International Search Report issued in International Patent Application No. PCT/JP2020/002001.
Apr. 7, 2020 Written Opinion issued in International Patent Application No. PCT/JP2020/002001.

* cited by examiner

THREAD FORMING TAP FOR BALLSCREW

TECHNICAL FIELD

The present invention relates to a ballscrew thread forming tap, and, more particularly, to a technique for reducing a thrust force required to force the thread forming tap in a tapping operation in which an internal thread is machined by the ballscrew thread forming tap.

BACKGROUND ART

There is known a thread forming tap including a complete thread portion and a leading portion which is provided to be contiguous with the complete thread portion and which has a diameter reduced in a direction toward a distal end of the thread forming tap, such that the complete thread portion and the leading portion are provided with an external thread in which protruding portions and relieved portions are alternately formed, wherein the thread forming tap is to be screwed into a prepared hole provided in a workpiece, so as to cause an inner circumferential surface of the prepared hole to be plastically deformed for thereby forming an internal thread corresponding to the external thread provided in the complete thread portion. A thread forming tap described in Patent Document 1 is an example of such a thread forming tap.

PRIOR ART DOCUMENT

Patent Documents

Patent Document 1:
Japanese Unexamined Patent Application Publication No. 2004-314231

DISCLOSURE OF THE INVENTION

Object to be Achieved by the Invention

By the way, when a tapping (rolling) operation is performed, a tapping machine applies, to the thread forming tap, a rotation torque and a thrust force acting in a forward direction, such that a screw thread of the external thread in the leading portion is caused to bite into the inner circumferential surface of the prepared hole so as to cause the inner circumferential surface to be plastically deformed and to cause the leading portion of the thread forming tap to be screwed into the prepared hole.

The screw thread of the external thread has a leading flank and a trailing flank, which are to be positioned on a front side of the trailing flank and on a rear side of the leading flank, respectively. Each of the leading flank and the trailing flank receives, from the workpiece, a pressure by which the plastic deformation is caused in the workpiece. Further, the leading flank receives, from the workpiece, a reaction force acting against the thrust force. Therefore, in the tapping operation, the large pressure is applied to the leading flank.

In a case in which a tapping operation is performed to form an internal thread that is a ballscrew thread having a semi-circular-shaped root, by using a thread forming tap having an external thread consisting of a semi-circular-shaped screw thread corresponding to the internal thread, particularly, dimensions and shape of the formed internal thread as the ballscrew thread are strictly required. When wear of the leading flank is progressed by application of the reaction force of the thrust force from the workpiece to the leading flank in addition to application of the pressure (by which the workpiece is to be plastically deformed) from the workpiece, similarly as described above, the shape of the ballscrew thread formed in the tapping operation could collapse resulting in reduction of the shape accuracy.

The present invention was made in view of the background discussed above. It is therefore an object of the present invention to suppress reduction of the shape accuracy of the ballscrew thread, by reducing the pressure applied to the leading flank in the tapping operation for forming the ballscrew thread.

Measures for Solving the Problem

The gist of the present invention is that, in a ballscrew thread forming tap comprising (a) a complete thread portion and a leading portion which is provided to be contiguous with the complete thread portion and which has a diameter reduced in a direction toward a distal end of the ballscrew thread forming tap, such that the complete thread portion and the leading portion are provided with an external thread having a semi-circular cross-sectional shape, wherein the thread forming tap is to be screwed into a prepared hole provided in a workpiece, so as to cause an inner circumferential surface of the prepared hole to be plastically deformed for thereby forming a ballscrew thread corresponding to the external thread provided in the complete thread portion, (b) a screw thread of the external thread has a leading flank and a trailing flank, which are to be positioned on a front side of the trailing flank and on a rear side of the leading flank, respectively, when the thread forming tap is screwed into the prepared hole, and (c) the screw thread is formed such that, in the leading portion, an indentation depth into the workpiece made by the leading flank is smaller than an indentation depth into the workpiece made by the trailing flank.

Effect of the Invention

In the ballscrew thread forming tap according to the present invention, the screw thread of the external thread has the leading flank and the trailing flank, which are to be positioned on the front side of the trailing flank and on the rear side of the leading flank, respectively, when the thread forming tap is screwed into the prepared hole, and the screw thread is formed such that, in the leading portion, the indentation depth into the workpiece made by the leading flank is smaller than the indentation depth into the workpiece made by the trailing flank. Owing to this feature, during a tapping operation, a pressure, which is applied from the workpiece to the leading flank, for plastically deforming the workpiece, is made smaller than that applied from the workpiece to the trailing flank. Thus, the pressure applied to the leading flank and wear of the leading flank are suppressed so that reduction of shape accuracy of a ballscrew thread is suppressed. Further, reduction of durability of the ballscrew thread forming tap and reduction of the tool life are suppressed.

It is preferable that a pitch of the screw thread in at least a part of the leading portion is larger than a pitch of the screw thread in the complete thread portion such that the screw thread in the leading portion does not become wider than the ballscrew thread that is formed in the workpiece. Owing to this feature, during the tapping operation, the pressure, which is applied from the workpiece to the leading flank, for plastically deforming the workpiece, is made smaller than that applied from the workpiece to the trailing flank. Thus, the pressure applied to the leading flank and the wear of the leading flank are suppressed so that the reduction of the shape accuracy of the ballscrew thread is suppressed. Further, the reduction of the durability of the ballscrew thread forming tap and the reduction of the tool life are suppressed.

Further, it is preferable that a pitch of the screw thread in the leading portion is a constant value, and is larger than a pitch of the screw thread in the complete thread portion. Owing to this feature, the pressure, which is applied from the workpiece to the leading flank, for plastically deforming the workpiece, is made smaller than that applied from the workpiece to the trailing flank. Thus, during the tapping operation, the pressure applied to the leading flank and the wear of the leading flank are suppressed so that the reduction of the shape accuracy of the ballscrew thread is suppressed. Further, the reduction of the durability of the ballscrew thread forming tap and the reduction of the tool life are suppressed.

Further, it is preferable that a pitch of the screw thread in a part of the leading portion is larger than a pitch of the screw thread in the complete thread portion. Owing to this feature, the pressure, which is applied from the workpiece to the leading flank, for plastically deforming the workpiece, is made smaller than that applied from the workpiece to the trailing flank. Thus, during the tapping operation, the pressure applied to the leading flank and the wear of the leading flank are suppressed so that the reduction of the shape accuracy of the ballscrew thread is suppressed. Further, the reduction of the durability of the ballscrew thread forming tap and the reduction of the tool life are suppressed.

Further, it is preferable that a pitch of the screw thread in the leading portion is increased as viewed in a direction toward a distal end of the leading portion. Owing to this feature, during the tapping operation, the pressure, which is applied from the workpiece to the leading flank, for plastically deforming the workpiece, is made smaller than that applied from the workpiece to the trailing flank. Thus, the pressure applied to the leading flank and the wear of the leading flank are suppressed so that the reduction of the shape accuracy of the ballscrew thread is suppressed. Further, the reduction of the durability of the ballscrew thread forming tap and the reduction of the tool life are suppressed.

Further, it is preferable that the screw thread in the leading portion is formed by bringing the trailing flank closer to the leading flank such that a pitch of the screw thread in the leading portion is larger than a pitch of the screw thread in the complete thread portion. Owing to this feature, during the tapping operation, the pressure, which is applied from the workpiece to the leading flank, for plastically deforming the workpiece, is made smaller than that applied from the workpiece to the trailing flank. Thus, the pressure applied to the leading flank and the wear of the leading flank are suppressed so that the reduction of the shape accuracy of the ballscrew thread is suppressed. Further, the reduction of the durability of the ballscrew thread forming tap and the reduction of the tool life are suppressed.

Further, it is preferable that the screw thread in the leading portion is formed by bringing the trailing flank closer to the leading flank as viewed in a direction toward a distal end of the leading portion such that a pitch of the screw thread in the leading portion is increased as viewed in the direction toward the distal end of the leading portion. Owing to this feature, during the tapping operation, the pressure, which is applied from the workpiece to the leading flank, for plastically deforming the workpiece, is made smaller than that applied from the workpiece to the trailing flank. Thus, the pressure applied to the leading flank and the wear of the leading flank are suppressed so that the reduction of the shape accuracy of the ballscrew thread is suppressed. Further, the reduction of the durability of the ballscrew thread forming tap and the reduction of the tool life are suppressed.

MODES FOR CARRYING OUT THE INVENTION

Hereinafter, preferred embodiments of the invention will be described in detail with reference to the accompanying drawings. It is noted that, in the embodiments described below, the figures of the drawings are simplified or deformed, as needed, for convenience of description, and each portion is not necessarily precisely depicted in terms of dimension ratio, shape, etc.

First Embodiment

Figure 1:
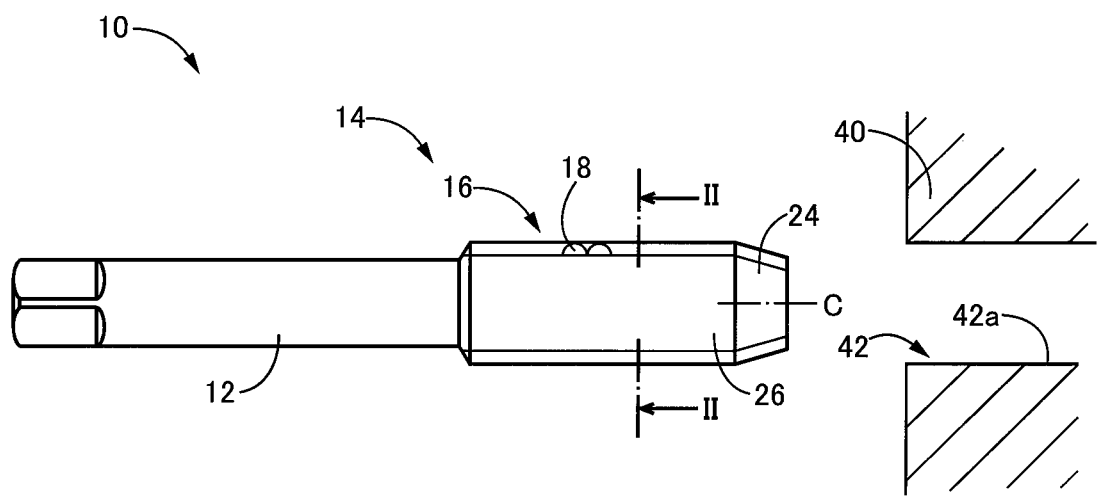
FIG. 1 is a view explaining a ballscrew thread forming tap as an embodiment of the present invention, and is a front view as seen in a direction perpendicular to an axis of the tap.
Figure 2:
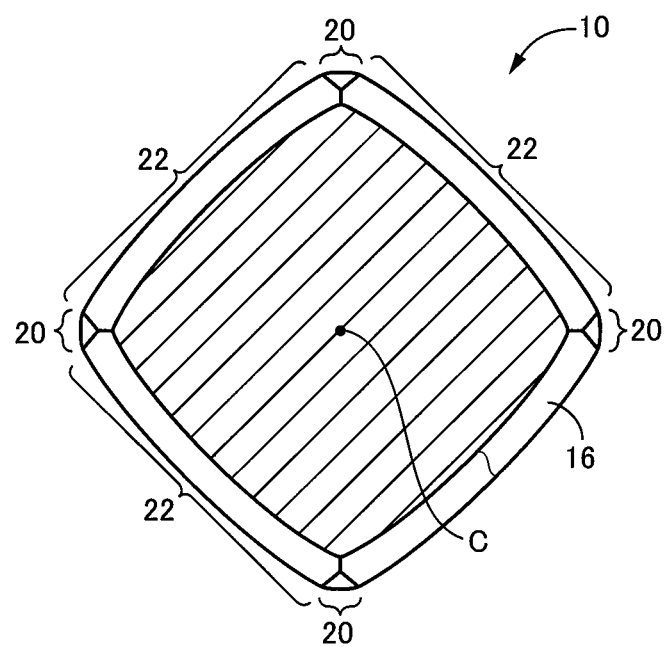
FIG. 2 is a cross-sectional view of the ballscrew thread forming tap, taken along arrows II-II in FIG. 1.

FIG. 1 is a view showing a ballscrew thread forming tap (hereinafter referred to as thread forming tap) 10 as an embodiment of the present invention, and is a front view as seen in a direction perpendicular to an axis C about which the thread forming tap 10 is to be rotated. The thread forming tap 10 includes a shank portion 12 that is to be attached to a spindle of a tapping machine (not shown) through a holder (not shown), and a thread portion 16 that is provided to form (roll) an internal thread, such that the shank portion 12 and the thread portion 16 are coaxially integral with each other. FIG. 2 is a view of a cross section that is cut along a screw thread 18 of the thread portion 16 in a part indicated by arrows II-II in FIG. 1, wherein the cross section is substantially perpendicular to the axis C. The thread portion 16 has a polygonal shape defined by sides each of which is outwardly curved. In the present embodiment, the thread portion 16 has a substantially square shape in its cross section, and has an outer circumferential surface provided with an external thread 14 that is to be caused to bite into an inner circumferential surface (surface layer portion) 42a of a prepared hole 42 of a workpiece (internal thread material) 40 so as to cause the inner circumferential surface 42a to be plastically deformed for thereby forming the internal thread. The thread forming tap 10 according to the present embodiment is to be used to machine a single thread, and accordingly the external thread 14 is also a single thread.

The screw thread 18 constituting the external thread 14 has a cross-sectional shape corresponding to a shape of a valley of a ballscrew thread (JIS B1192) as the internal thread that is to be formed, and extends along a helix having a lead angle of the ballscrew thread (internal thread). The cross-sectional shape of the screw thread 18 is a symmetrical round shape. The thread portion 16 includes a plurality of protruding portions 20 (four protruding portions 20 in the present embodiment) and a plurality of relieved portions 22 that are alternately arranged in a helical direction in which the screw thread 18 extends. The protruding portions 20, in each of which the screw thread 18 protrudes radially outwardly, are arranged equiangularly about the axis C at an angular pitch of 90°. The relieved portions 22, each of which has a small diameter and is contiguous to a corresponding one of the protruding portions 20 in the helical direction, are arranged equiangularly about the axis C at an angular pitch of 90°. That is, the multiplicity of protruding portions 20 are arranged in four lines that correspond to respective vertexes of a regular square shape, such that the protruding portions 20 of each of the four lines are successively arranged in parallel to the axis C, and such that the four lines of protruding portions 20 are arranged equiangularly about the axis C.

The thread portion 16 includes a complete thread portion 26 and a leading portion 24 which is provided to be contiguous with the complete thread portion 26. In the complete thread portion 26 having a diameter constant in a direction of the axis C, a pitch Po, which is a distance between crests of the screw thread 18, is constant in the direction of the axis C. In the leading portion 24 having a diameter reduced in a direction toward a distal end of the thread forming tap 10, a pitch Pg of the screw thread 18 is larger than the pitch Po of the screw thread 18 in the complete thread portion 26. In the leading portion 24, the screw thread 18 having the symmetrical semi-circular shape, i.e., symmetrical round shape in its cross section has an outside diameter, an effective diameter and a root diameter each of which is reduced at a constant rate of change in the direction toward the distal end of the thread forming tap 10. The protruding portions 20 and the relieved portions 22 are alternately arranged in a circumferential direction in the leading portion 24 as in the complete thread portion 26, so that the leading portion 24 has substantially a regular square cross-sectional shape as the complete thread portion 26 that is shown in FIG. 2.

Figure 3:
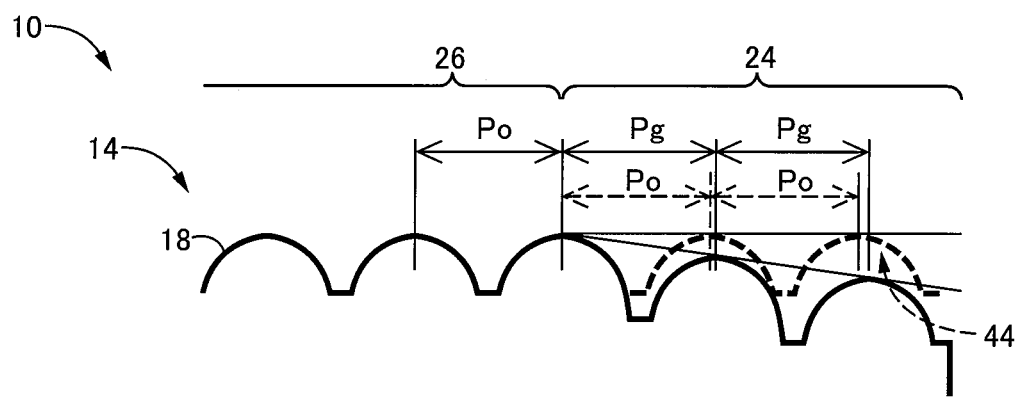
FIG. 3 is a view showing a major portion of a cross section containing an axis of the thread forming tap of FIG. 1, and explaining a pitch Po of a screw thread in a complete thread portion and a pitch Pg of the screw thread in a leading portion that is contiguous to the complete thread portion in a direction of the axis.

FIG. 3 is a view showing a major portion of a cross section containing an axis of the thread forming tap 10 of FIG. 1 and passing through the protruding portions 20, and indicating the pitch Po of the screw thread 18 in the complete thread portion 26 and the pitch Pg of the screw thread 18 in the leading portion 24 that is contiguous to the complete thread portion 26 in the direction of the axis C. The pitch Pg of the screw thread 18 in the leading portion 24 is a constant value, and is larger than the pitch Po of the screw thread 18 in the complete thread portion 26 such that the screw thread 18 in the leading portion 24 does not become wider than a ballscrew thread 44 that is formed in the prepared hole 42 of the workpiece 40. The ballscrew thread 44 formed in the prepared hole 42 of the workpiece 40 has substantially the same shape as the screw thread 18 in the complete thread portion 26.

Figure 4:
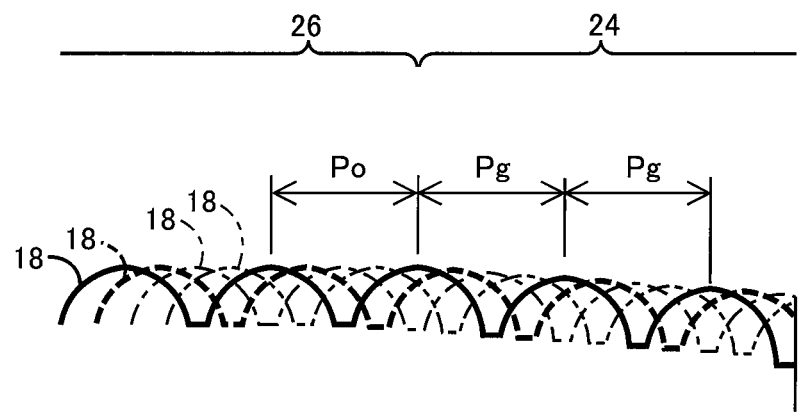
FIG. 4 is a view showing, in an overlapping manner, cross sections of the screw thread of the ballscrew thread forming tap of FIG. 1, in a case in which the pitch Pg of the screw thread in the leading portion is larger than the pitch Po of the screw thread in the complete thread portion, wherein the cross sections are taken in respective planes which contain the axis and which are angularly spaced by 90° about the axis.
Figure 5:
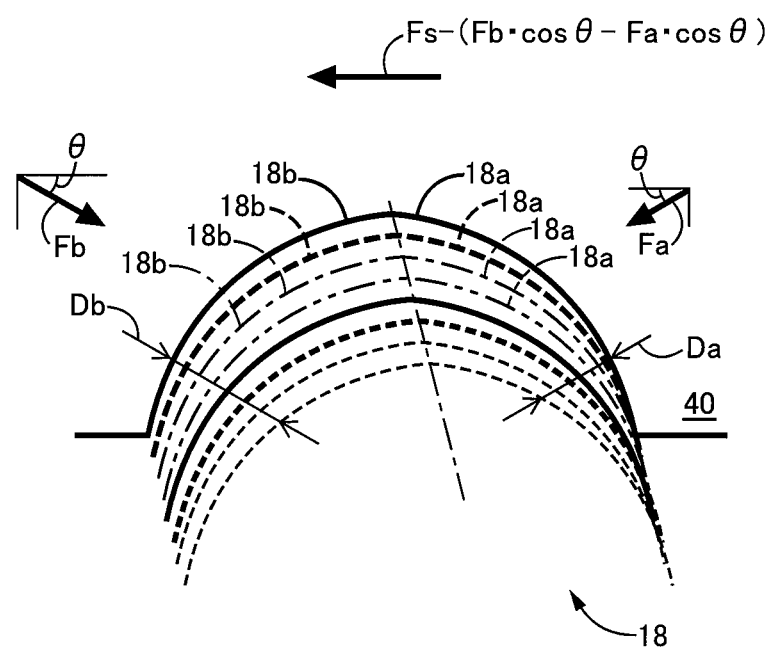
FIG. 5 is a view explaining an action of the ballscrew thread forming tap of FIG. 4 for expanding a prepared hole by causing the screw thread in the leading portion to bite into an inner circumferential surface of the prepared hole.

FIG. 4 is a view showing, in an overlapping manner, cross sections of the screw thread 18 of the thread forming tap 10 of FIG. 1, wherein the cross sections are taken in respective planes which contain the axis C and which are angularly spaced by 90° about the axis C. FIG. 5 is a view explaining an action of the thread forming tap 10 for expanding the prepared hole 42 of the workpiece 40 by causing the screw thread 18 in the leading portion 24 to bite into the inner circumferential surface 42a of the prepared hole 42 upon rotation of the thread forming tap 10 when the leading portion 24 of the thread forming tap 10 is screwed into the prepared hole 42. In FIGS. 4 and 5, thick solid line represents the screw thread in a first cross section, thick broken line represents the screw thread in a second cross section when the tap 10 has been rotated clockwise about the axis C by 90° (in forward direction) from the first cross section, one-dot chain line represents the screw thread in a third cross section when the tap 10 has been further rotated clockwise about the axis C by 90° (in forward direction) from the second cross section, and tow-dot chain line represents the screw thread in a fourth cross section when the tap 10 has been further rotated clockwise about the axis C by 90° (in forward direction) from the third cross section.

When the thread forming tap 10 is screwed into the prepared hole 42 of the workpiece 40 with the rotation torque (N·cm) and the thrust force (N) (acting in the forward direction) being applied from the tapping machine (not shown) to the thread forming tap 10, the leading flank 18a, which is located on a front side of the trailing flank 18b, has a smaller amount of bite into the workpiece 40, i.e., a smaller indentation depth, than the trailing flank 18b located on a rear side of the leading flank 18a, as shown in FIG. 5, because the pitch Pg of the screw thread 18 in the leading portion 24 is set to be larger than the pitch Po of the screw thread 18 in the complete thread portion 26. That is, an indentation depth Da, which is an amount of bite into the workpiece 40, is smaller than an indentation depth Db, which is an amount of bite into the workpiece 40, so that the an amount of plastic deformation of the workpiece 40, which is made by the leading flank 18a, is smaller than an amount of plastic deformation of the workpiece 40, which is made by the trailing flank 18b. Therefore, a reaction force Fa that is a composite value of reaction forces applied to the leading flank 18a from the workpiece 40 is smaller than a reaction force Fb that is a composite value of reaction forces applied to the trailing flank 18b from the workpiece 40.

Consequently, a thrust reaction force Fs, which acts against the thrust force (pushing force) of the forward direction applied by the tapping machine (not shown), is reduced by a value represented by Fb·cos θ−Fa·cos θ that corresponds to a difference between Fb·cos θ that is a component of the reaction force Fb (applied to the trailing flank 18b from the workpiece 40) in the direction of the axis C and Fa·cos θ that is a component of the reaction force Fa (applied to the leading flank 18a from the workpiece 40) in the direction of the axis C, where "θ" represents an angle defined between the axis C and a direction of each of the reaction forces Fa, Fb. That is, the thrust reaction force Fs is reduced to a reduced value represented by Fs−(Fb·cos θ−Fa·cos θ). Thus, a pressure applied to the leading flank 18a is reduced whereby wear of the leading flank 18a is reduced so that reductions of durability and tool life of the thread forming tap 10 are suppressed.

Figure 11:
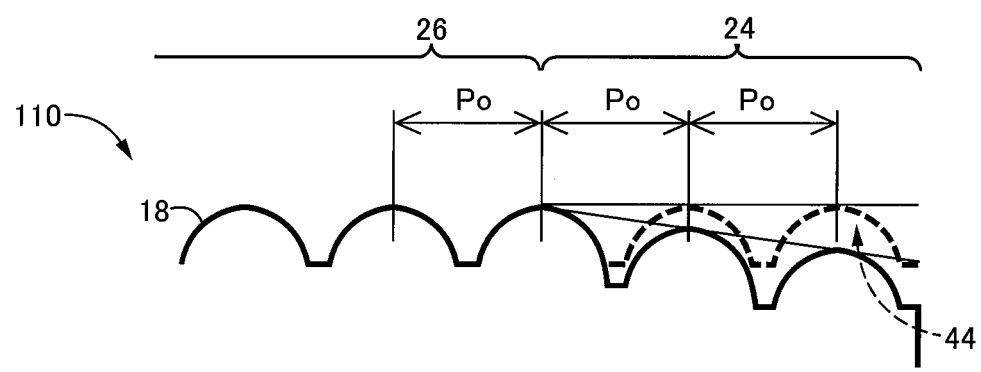
FIG. 11 is a view corresponding to the view of FIG. 3 and a cross-sectional view showing a major portion of a ballscrew thread forming tap as a comparative example having a standard shape.
Figure 12:
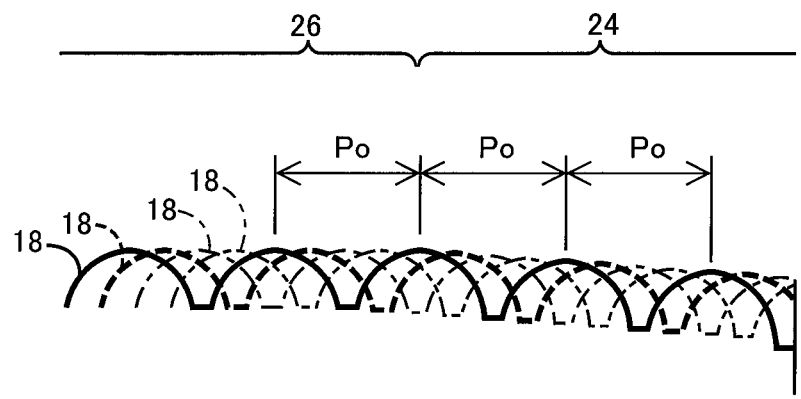
FIG. 12 is a view corresponding to the view of FIG. 4, and showing, in an overlapping manner, cross sections of the screw thread of the ballscrew thread forming tap of FIG. 11, wherein the cross sections are taken in respective planes which contain the axis C and which are angularly spaced by 90° about the axis C.
Figure 13:
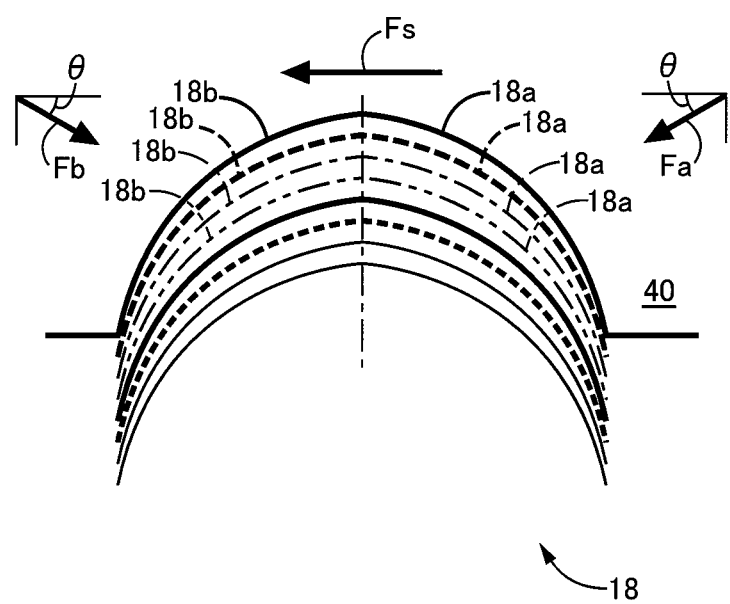
FIG. 13 is a view corresponding to the view of FIG. 5, and explaining an action of the ballscrew thread forming tap of FIG. 11 for expanding the prepared hole by causing the screw thread in the leading portion to bite into the inner circumferential surface of the prepared hole.

FIG. 11 is a cross-sectional view showing a major portion of a thread forming tap 110 as a comparative example having a standard shape so that the pitch Po of the screw thread 18 in the complete thread portion 26 and the pitch Pg of the screw thread 18 in the leading portion 24 are equal to each other. FIG. 12 is a view showing, in an overlapping manner, cross sections of the screw thread 18 of the thread forming tap 110 as the comparative example of FIG. 11, wherein the cross sections are taken in respective planes which contain the axis C and which are angularly spaced by 90° about the axis C. FIG. 13 is a view explaining an action of the thread forming tap 110 as the comparative example of FIG. 11 for expanding the prepared hole 42 by causing the screw thread 18 in the leading portion 24 to bite into the inner circumferential surface 42a of the prepared hole 42.

As shown in FIG. 13, the indentation depth Da, which is the amount of bite into the workpiece 40 by the leading flank 18a, is substantially equal to the indentation depth Db, which is the amount of bite into the workpiece 40 by the trailing flank 18b, so that the amount of plastic deformation of the workpiece 40, which is made by the leading flank 18a, is substantially equal to the amount of plastic deformation of the workpiece 40, which is made by the trailing flank 18b. Therefore, the reaction force Fa applied to the leading flank 18a from the workpiece 40 is substantially equal to the reaction force Fb applied to the trailing flank 18b from the workpiece 40.

Consequently, the difference between Fb·cos θ that is the component of the reaction force Fb (applied to the trailing flank 18b from the workpiece 40) in the direction of the axis C and Fa·cos θ that is the component of the reaction force Fa (applied to the leading flank 18a from the workpiece 40) in the direction of the axis C, is substantially zero. Thus, it is not possible to obtain an effect of reducing the thrust reaction force Fs that acts against the thrust force of the forward direction applied by the tapping machine (not shown). That is, the thrust reaction force Fs and the reaction force Fa from the workpiece 40 are applied to the leading flank 18a whereby the wear of the leading flank 18a is increased, so that the reductions of the durability and the tool life of the thread forming tap of the comparative example cannot be avoided.

As described above, the thread forming tap 10 according to the present embodiment includes the complete thread portion 26 and the leading portion 24 which is provided to be contiguous with the complete thread portion 26 and which has the diameter reduced in the direction toward the distal end of the thread forming tap 10, such that the complete thread portion 26 and the leading portion 24 are provided with the external thread 14 having the semi-circular cross-sectional shape. The thread forming tap 10 is to be screwed into the prepared hole 42 provided in the workpiece 40, so as to cause the inner circumferential surface 42a of the prepared hole 42 to be plastically deformed for thereby forming the ballscrew thread 44 corresponding to the external thread 14 provided in the complete thread portion 26. The screw thread 18 of the external thread 14 has the leading flank 18a and the trailing flank 18b, which are to be positioned on a front side of the trailing flank 18b and on a rear side of the leading flank 18a, respectively, when the thread forming tap 10 is screwed into the prepared hole 42. The screw thread 18 is formed such that, in the leading portion 24, the indentation depth Da into the workpiece 40 made by the leading flank 18a is smaller than the indentation depth Db into the workpiece 40 made by the trailing flank 18b.

Owing to this construction, during the tapping operation, the reaction force Fa, which is applied to the leading flank 18a from the workpiece 40, for plastically deforming the workpiece 40, is made smaller than the reaction force Fb applied to the trailing flank 18b from the workpiece 40. Thus, the pressure applied to the leading flank 18a and the wear of the leading flank 18a are suppressed during the tapping operation so that the ballscrew thread having a high accuracy can be obtained. Further, the pressure applied to the leading flank 18a and the wear of the leading flank 18a are suppressed so that so that the reduction of the durability and reduction of the tool life of the thread forming tap 10 are suppressed.

Further, in the thread forming tap 10 according to the present embodiment, the screw thread 18 has the symmetrical round cross-sectional shape, and the pitch Pg of the screw thread 18 in an entirety of the leading portion 24 is larger than the pitch Po of the screw thread 18 in the complete thread portion 26 such that the indentation depth into the workpiece 40 made by the leading flank 18a of the screw thread 18 in the leading portion 24 does not become wider than the ballscrew thread 44 that is formed in the prepared hole 42 of the workpiece 40. Owing to this construction, during the tapping operation, the reaction force Fa, which is applied from the workpiece 40 to the leading flank 18a for plastically deforming the workpiece 40, is made smaller than the reaction force Fb applied from the workpiece 40 to the trailing flank 18b. Therefore, the pressure applied to the leading flank 18a during the tapping operation is suppressed and accordingly the wear of the leading flank 18a is suppressed, so that the ballscrew thread having the high accuracy can be obtained.

Second Embodiment

There will be described other embodiments of this invention. The same reference signs as used in the above-described embodiment will be used in the following embodiments, to identify the practically corresponding elements, and descriptions thereof are not provided.

Figure 6:
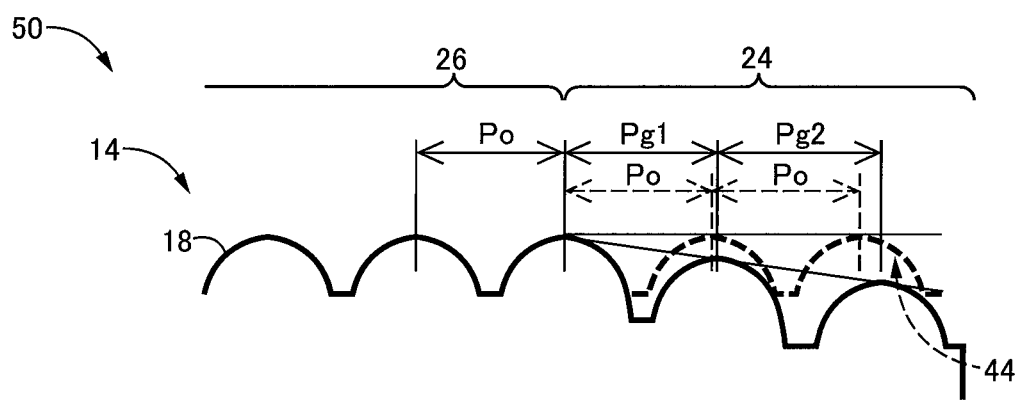
FIG. 6 is a view corresponding to the view of FIG. 3, and showing a screw thread of a ballscrew thread forming tap as another embodiment of the present invention.
Figure 7:
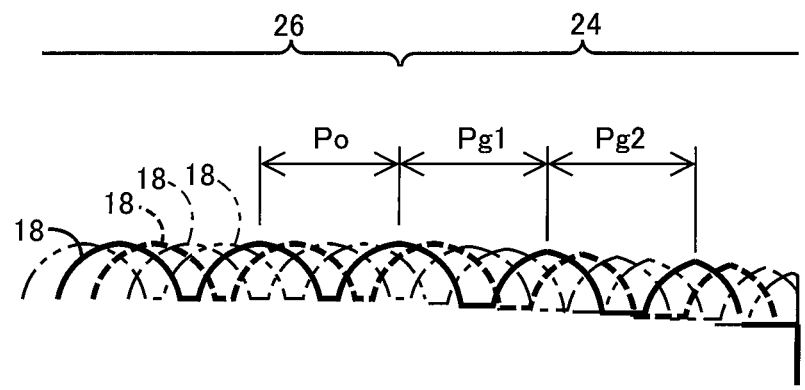
FIG. 7 is a view corresponding to the view of FIG. 4, and showing, in an overlapping manner, cross sections of the screw thread of the ballscrew thread forming tap of FIG. 6, wherein the cross sections are taken in respective planes which contain the axis C and which are angularly spaced by 90° about the axis C.
Figure 8:
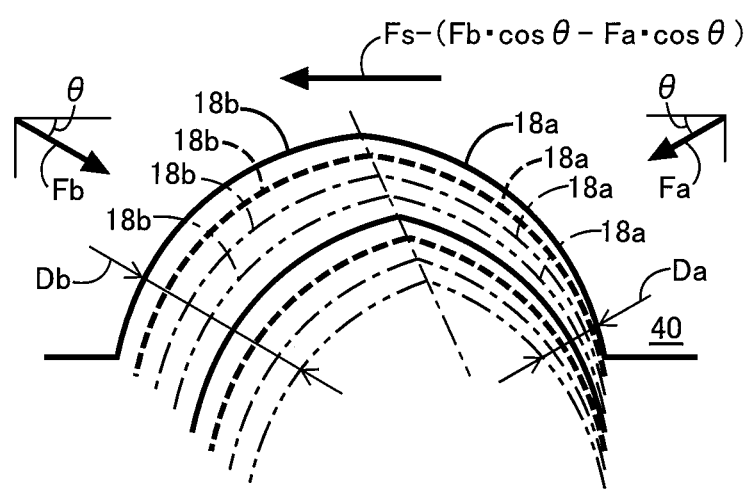
FIG. 8 is a view corresponding to the view of FIG. 5, and explaining an action of the ballscrew thread forming tap of FIG. 6 for expanding the prepared hole by causing the screw thread in the leading portion to bite into the inner circumferential surface of the prepared hole.

FIG. 6 is a view corresponding to the view of FIG. 3 showing the screw thread 18, and is a cross-sectional view showing a major portion of a thread forming tap 50 as another embodiment of the present embodiment. FIG. 7 is a view showing, in an overlapping manner, cross sections of the screw thread 18 of the thread forming tap 50 of FIG. 6, wherein the cross sections are taken in respective planes which contain the axis C and which are angularly spaced by 90° about the axis C. FIG. 8 is a view explaining an action of the thread forming tap 50 of FIG. 6 for expanding the prepared hole 42 by causing the screw thread 18 in the leading portion 24 to bite into the inner circumferential surface 42a of the prepared hole 42.

In the thread forming tap 50 of the present embodiment, the screw thread 18 in the leading portion 24 is formed by bringing the trailing flank 18b closer to the leading flank 18a as viewed in a direction toward a distal end of the leading portion 24 such that the pitch Pg of the screw thread 18 in the leading portion 24 is sequentially set to a pitch Pg1 and a pitch Pg2 wherein the pitch Pg1 is larger than the pitch Po of the screw thread 18 in the complete thread portion 26, and the pitch Pg2 is larger than the pitch Pg1, namely, such that the pitch Pg of the screw thread 18 in the leading portion 24 is increased as viewed in the direction toward the distal end of the leading portion 24.

Thus, in the thread forming tap 50 of the present embodiment, the screw thread 19 in the leading portion 24 is formed by bringing the trailing flank 18b closer to the leading flank 18a as viewed in the direction toward the distal end of the leading portion 24 such that the pitch Pg of the screw thread 18 in the leading portion 24 is larger than the pitch Po of the screw thread in the complete thread portion. Owing to this construction, during the tapping operation, the reaction force Fa, which is applied from the workpiece 40 to the leading flank 18a, for plastically deforming the workpiece, is made smaller than the reaction force Fb applied from the workpiece 40 to the trailing flank 18b. Thus, the pressure applied to the leading flank 18a during the tapping operation is suppressed and accordingly the wear of the leading flank 18a is suppressed, so that the reduction of the shape accuracy of the ballscrew thread is suppressed.

(CAE Analysis)

The present inventor prepared, by 3D (three dimensional)-CAD (Computer Aided Design), a comparative example model in which the pitch Pg of the screw thread 18 in the leading portion 24 is equal to the pitch Po of the screw thread 18 in the complete thread portion 26 (Pg=Po), and a present embodiment model in which the pitches Pg1, Pg2 of the screw thread 18 in the leading portion 24 are larger than the pitch Po of the screw thread 18 in the complete thread portion 26, and are increased as viewed in the direction toward the distal end of the leading portion 24. Then, the inventor analyzed, through CAE, the thrust force F (N) applied from each thread forming tap when a rolling (tapping operation) is performed under a rolling condition describe below. Each of the comparative example model and the present embodiment model is a thread forming tap in which a nominal diameter is 6 mm, a pitch is 1 mm (single external thread), and a chamfer length (i.e., length of the leading portion 24) is 2.5 pitches, and is the same as the thread forming tap 10 shown in FIGS. 1-3 except for the pitch Pg of the screw thread 18 in the leading portion 24.

(Rolling Condition)
Work Material: steel (SCM440)
Rolling Speed: 10 m/min

Figure 9:
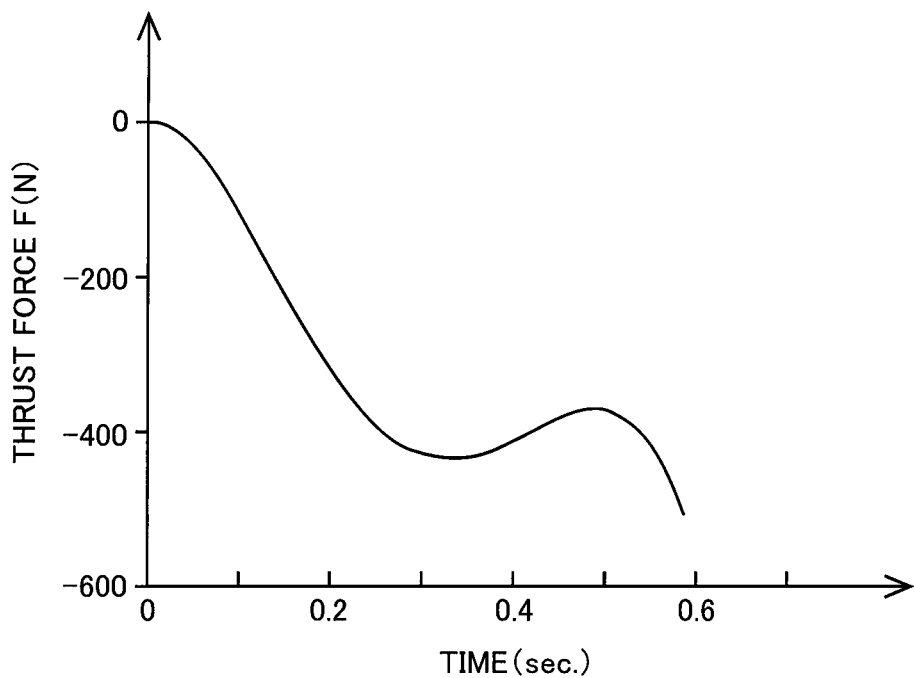
FIG. 9 is a view showing a thrust force F during a rolling operation using the ballscrew thread forming tap of FIG. 6, in a two-dimensional coordinates with a time being represented on its horizontal axis and with the thrust force F being represented on its vertical axis, wherein the thrust force F is calculated through CAE (Computer Aided Engineering) analysis.
Figure 14:
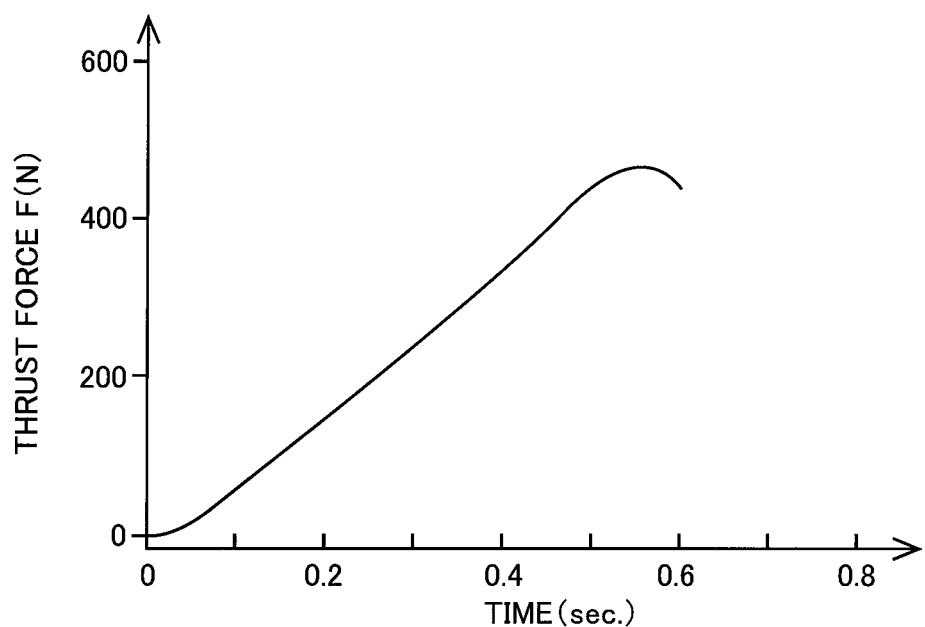
FIG. 14 is a view corresponding to the view of FIG. 9, and showing the thrust force F during the rolling operation using the ballscrew thread forming tap of FIG. 11, in a two-dimensional coordinates with a time being represented on its horizontal axis and with the thrust force F being represented on its vertical axis, wherein the thrust force F is calculated through CAE (Computer Aided Engineering) analysis.

Each of FIG. 9 and FIG. 14 is a view showing the thrust force (pushing force) F (N) when the screw thread is caused to bite into the workpiece in an early stage of the tapping operation performed by a corresponding one of the present embodiment model and the comparative example model, in a two-dimensional coordinates with a time being represented on its horizontal axis and with the force being represented on its vertical axis. As shown in FIG. 9, the thrust force during forward movement (with forward rotation) in the present embodiment model is much smaller than that in the comparative example model, which is shown in FIG. 14.

Third Embodiment

Figure 10:
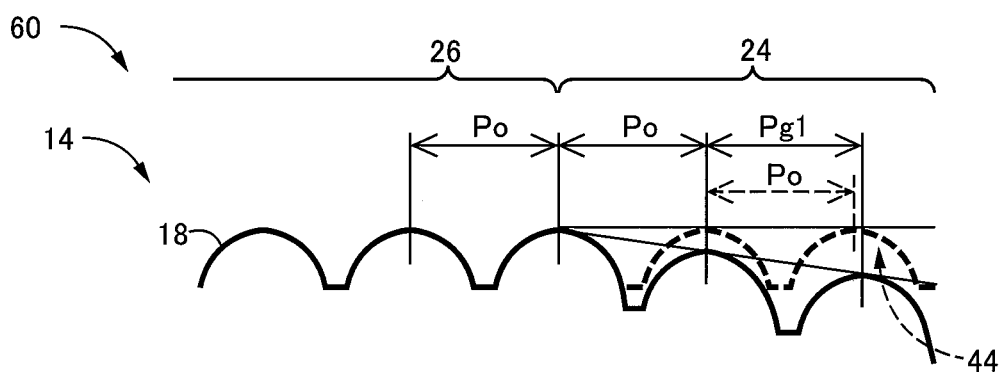
FIG. 10 is a view corresponding to the view of FIG. 3, and showing a screw thread of a ballscrew thread forming tap as another embodiment of the present invention.

FIG. 10 is a view corresponding to the view of FIG. 3, and showing the screw thread 18 of a thread forming tap 60 as still another embodiment of the present invention. In this thread forming tap 60, the pitch Pg of the screw thread 18 in the leading portion 24 is increased in a direction toward a distal end of the leading portion 24, such that the leading portion 24 includes sections contiguous to each other, wherein the pitch Pg is equal to the pitch Po (Pg=Po) in one of the sections, and the pitch Pg is the pitch Pg1 that is larger than the pitch Po in another one of the sections.

In the thread forming tap 60 according to the present embodiment, the pitch Pg1 of the screw thread 18 in a part of the leading portion 24 is larger than the pitch Po of the screw thread 18 in the complete thread portion 26. Owing to this construction, during the tapping operation, the pressure, which is applied to the leading flank 18a from the workpiece 40, for plastically deforming the workpiece 40, is made smaller than the pressure applied to the trailing flank 18b. Thus, the reaction force Fa applied to the leading flank 18a is suppressed during the tapping operation so that the reduction of the durability and reduction of the tool life of the thread forming tap 10 are suppressed.

While the embodiments of the present invention have been described by reference to the accompanying drawings, it is to be understood that what have been described above are merely the embodiments of the present invention, and that the present invention may be embodied with various changes and modifications based on knowledges of those skilled in the art.

Each of the thread forming taps 10, 50, 60 according to the above-described embodiments is to be used to be screwed into the prepared hole 42 provided in the workpiece 40, with the leading portion 24 being first introduced into the prepared hole 42, whereby the screw thread 18 provided in the external thread 14 is caused to bite into the inner circumferential surface 42a of the prepared hole 42, so as to cause the inner circumferential surface 42a to be plastically deformed for thereby forming the ballscrew thread 44. For example, a drill or reamer may be provided integrally in a distal end portion of the thread forming tap, such that the prepared hole 42 is machined by the drill or reamer. Further, an inside-diameter finishing blade or blades may be provided integrally in the thread forming tap, such that an inside diameter of the internal thread is finished by the inside-diameter finishing blade or blades. Moreover, the present invention is applicable not only to a thread forming tap for machining a single thread but also to a thread forming tap for machining a multiple thread such as a double or more thread.

In each of the thread forming taps 10, 50, 60 according to the above-described embodiments, it is preferable that the plurality of screw threads 18 are provided to be arranged in three or more lines equiangularly about the axis C such that the screw threads 18 of each line are contiguous to each other in parallel to the axis C. However, the protruding portions 20 may be provided such that the protruding portions 20 of each line are contiguous to each other along a helix twisted about the axis C, or such that the protruding portions 20 are arranged non-equiangularly about the axis C. That is, the protruding portions 20 may be arranged in any one of various manners. Further, oil grooves or the like such as three or more oil grooves may be provided to extend in a direction of the axis C to divide the external thread 14 in a circumferential direction, as needed, such that a coolant is supplied through the oil grooves.

DESCRIPTION OF REFERENCE SIGNS

10; 50; 60: thread forming tap
14: external thread
16: thread portion
18: screw thread
18a: leading flank
18b: trailing flank
24: leading portion
26: complete thread portion
40: workpiece
42: prepared hole
42a: inner circumferential surface
44: ballscrew thread
C: axis
Da: indentation depth
Db: indentation depth
Pg: pitch of the screw thread in leading portion
Po: pitch of screw thread in complete thread portion

The invention claimed is:

1. A ballscrew thread forming tap comprising a complete thread portion and a leading portion which is provided to be contiguous with the complete thread portion and which has a diameter reduced in a direction toward a distal end of the ballscrew thread forming tap, such that the complete thread portion and the leading portion are provided with an external thread having a semi-circular cross-sectional shape, wherein the ballscrew thread forming tap is to be screwed into a prepared hole provided in a workpiece, so as to cause an inner circumferential surface of the prepared hole to be plastically deformed for thereby forming a ballscrew thread corresponding to the external thread provided in the complete thread portion,
wherein a screw thread of the external thread has a leading flank and a trailing flank, which are to be positioned on a front side of the trailing flank and on a rear side of the leading flank, respectively, when the ballscrew thread forming tap is screwed into the prepared hole,
wherein the screw thread is formed such that, in the leading portion, an indentation depth into the workpiece made by the leading flank is smaller than an indentation depth into the workpiece made by the trailing flank, and
wherein the screw thread in the leading portion is formed by bringing the trailing flank closer to the leading flank such that a pitch of the screw thread in the leading portion is larger than a pitch of the screw thread in the complete thread portion.

2. The ballscrew thread forming tap according to claim 1, wherein the pitch of the screw thread in at least a part of the leading portion is larger than the pitch of the screw thread in the complete thread portion such that the screw thread in the leading portion does not become wider than the ballscrew thread that is formed in the workpiece.

3. The ballscrew thread forming tap according to claim 1, wherein the pitch of the screw thread in the leading portion is a constant value, and is larger than the pitch of the screw thread in the complete thread portion.

4. The ballscrew thread forming tap according to claim 1, wherein the pitch of the screw thread in the leading portion is increased as viewed in a direction toward a distal end of the leading portion.

5. The ballscrew thread forming tap according to claim 1, wherein the screw thread in the leading portion is formed by bringing the trailing flank closer to the leading flank as viewed in a direction toward a distal end of the leading portion such that the pitch of the screw thread in the leading portion is increased as viewed in the direction toward the distal end of the leading portion.

6. A ballscrew thread forming tap comprising a complete thread portion and a leading portion which is provided to be contiguous with the complete thread portion and which has a diameter reduced in a direction toward a distal end of the ballscrew thread forming tap, such that the complete thread portion and the leading portion are provided with an external thread having a semi-circular cross-sectional shape, wherein the ballscrew thread forming tap is to be screwed into a prepared hole provided in a workpiece, so as to cause an inner circumferential surface of the prepared hole to be plastically deformed for thereby forming a ballscrew thread corresponding to the external thread provided in the complete thread portion,
wherein a screw thread of the external thread has a leading flank and a trailing flank, which are to be positioned on a front side of the trailing flank and on a rear side of the leading flank, respectively, when the ballscrew thread forming tap is screwed into the prepared hole,
wherein the screw thread is formed such that, in the leading portion, an indentation depth into the workpiece made by the leading flank is smaller than an indentation depth into the workpiece made by the trailing flank, and
wherein a pitch of the screw thread in a part of the leading portion is larger than a pitch of the screw thread in the complete thread portion.

7. The ballscrew thread forming tap according to claim 6, wherein the pitch of the screw thread in at least a part of the leading portion is larger than the pitch of the screw thread in the complete thread portion such that the screw thread in the leading portion does not become wider than the ballscrew thread that is formed in the workpiece.

8. A ballscrew thread forming tap comprising a complete thread portion and a leading portion which is provided to be contiguous with the complete thread portion and which has a diameter reduced in a direction toward a distal end of the ballscrew thread forming tap, such that the complete thread portion and the leading portion are provided with an external thread having a semi-circular cross-sectional shape, wherein the ballscrew thread forming tap is to be screwed into a prepared hole provided in a workpiece, so as to cause an inner circumferential surface of the prepared hole to be plastically deformed for thereby forming a ballscrew thread corresponding to the external thread provided in the complete thread portion, wherein a screw thread of the external thread has a leading flank and a trailing flank, which are to be positioned on a front side of the trailing flank and on a rear side of the leading flank, respectively, when the ballscrew thread forming tap is screwed into the prepared hole, wherein the screw thread is formed such that, in the leading portion, an indentation depth into the workpiece made by the leading flank is smaller than an indentation depth into the workpiece made by the trailing flank, and wherein a pitch of the screw thread in the leading portion is increased as viewed in a direction toward a distal end of the leading portion.

9. The ballscrew thread forming tap according to claim 8, wherein the pitch of the screw thread in at least a part of the leading portion is larger than a pitch of the screw thread in the complete thread portion such that the screw thread in the leading portion does not become wider than the ballscrew thread that is formed in the workpiece.

10. A ballscrew thread forming tap comprising a complete thread portion and a leading portion which is provided to be contiguous with the complete thread portion and which has a diameter reduced in a direction toward a distal end of the ballscrew thread forming tap, such that the complete thread portion and the leading portion are provided with an external thread having a semi-circular cross-sectional shape, wherein the ballscrew thread forming tap is to be screwed into a prepared hole provided in a workpiece, so as to cause an inner circumferential surface of the prepared hole to be plastically deformed for thereby forming a ballscrew thread corresponding to the external thread provided in the complete thread portion, wherein a screw thread of the external thread has a leading flank and a trailing flank, which are to be positioned on a front side of the trailing flank and on a rear side of the leading flank, respectively, when the ballscrew thread forming tap is screwed into the prepared hole, wherein the screw thread is formed such that, in the leading portion, an indentation depth into the workpiece made by the leading flank is smaller than an indentation depth into the workpiece made by the trailing flank, and wherein the screw thread in the leading portion is formed by bringing the trailing flank closer to the leading flank as viewed in a direction toward a distal end of the leading portion such that a pitch of the screw thread in the leading portion is increased as viewed in the direction toward the distal end of the leading portion.

11. The ballscrew thread forming tap according to claim 10, wherein the pitch of the screw thread in at least a part of the leading portion is larger than a pitch of the screw thread in the complete thread portion such that the screw thread in the leading portion does not become wider than the ballscrew thread that is formed in the workpiece.

\* \* \* \* \*